United States Patent [19]
Heim et al.

[11] Patent Number: 5,398,453
[45] Date of Patent: Mar. 21, 1995

[54] VEHICLE DOOR FRAME AND METHOD FOR MAKING THE SAME

[75] Inventors: Gunther Heim, Obertshausen; Bruno Kroll, Radevormwald, all of Germany

[73] Assignee: YMOS Aktiengesellschaft Industrieprodukte, Obertshausen, Germany

[21] Appl. No.: 204,080

[22] Filed: Mar. 1, 1994

[30] Foreign Application Priority Data

Mar. 4, 1993 [DE] Germany ............... 43 06 668.2

[51] Int. Cl.$^6$ .................... B60J 5/04; E06B 3/00
[52] U.S. Cl. ............................. 49/502; 49/506
[58] Field of Search ............ 49/502, 506, 348, 349, 49/350, 351, 352; 296/146.2, 146.5, 146.6

[56] References Cited

U.S. PATENT DOCUMENTS

| | | | |
|---|---|---|---|
| 1,663,518 | 3/1928 | Ledwinka | 49/502 X |
| 2,660,470 | 11/1953 | Nelson | 49/502 |
| 4,689,916 | 9/1987 | Shimizu | 49/502 X |
| 4,794,735 | 1/1989 | Batchelder et al. | 296/146.5 X |

Primary Examiner—Philip C. Kannan
Attorney, Agent, or Firm—W. G. Fasse; W. F. Fasse

[57] ABSTRACT

A vehicle door, for example a passenger car door, is supported by a door frame formed by a modular frame structure having a forward frame section, a rear frame section, an upper frame section, and a lower frame section. Additional components and accessories of the door, such as window lift mechanisms and lock mechanisms, are attached to the modular frame structure. At least a portion of each of the forward, lower and rear frame sections is formed from a continuous sectional member such as an extruded sectional member. The continuous sectional member includes a box cross-sectional portion that provides the required supporting strength for the door frame and includes laterally extending webs that are cut and bent along edge portions as required to form intermediate spacing webs as well as connecting flanges. The modular frame structure provides a simple and economical door frame, which is lightweight, yet strong, and which allows for the convenient attachment of various other door components, for example, on the connecting flanges.

19 Claims, 6 Drawing Sheets

VEHICLE DOOR FRAME AND METHOD FOR MAKING THE SAME

CROSS-REFERENCE TO RELATED APPLICATION

The present application is related to our copending and commonly assigned application for a "VEHICLE DOOR", U.S. Ser. No.: 08/204,075, filed on Mar. 1, 1994, Attorney Docket No.: 2976.

FIELD OF THE INVENTION

The invention relates to vehicle doors, for example passenger car doors, with a frame construction that constitutes a modular frame unit for supporting various door components, such as a window, inner and outer door cover panels, locking elements and the like. The invention further relates to a method for making a vehicle door frame.

BACKGROUND INFORMATION

A supporting frame for a vehicle door having a modular frame construction includes a forward frame section as viewed in the forward travel direction of the vehicle, a rear frame section, an upper frame section, and a lower frame section, which together form a modular supporting frame. A finished vehicle door also includes various other components and accessories, such as a device for opening and closing a window and guide members for guiding the window when it is raised and lowered. Further door elements include hinges, a door lock, and respective operating components for the lock as well as the inner decorative trim or cover panel of the door. In vehicle doors of conventional frame construction it is often technically complicated, difficult and expensive to attach the various other door components to the frame module.

OBJECTS OF THE INVENTION

In view of the foregoing it is the aim of the invention to achieve the following objects singly or in combination:

- to optimize a vehicle door in such a way that the entire structure becomes lighter and that a more cost efficient production is achieved, especially by a simplified assembly;
- to use at least part of a supporting door frame section simultaneously as a window guide member and as part of the door frame structure;
- to reduce the total number of door components while still assuring the required structural strength;
- to use standardized sectional frame members such as extruded sections to manufacture a modular supporting frame in a simple, strong, and economical manner;
- to manufacture vehicle door frames from standardized sectional frame members simply by cutting and bending frame section flanges to form intermediate spacing webs and connecting flanges of the door frame; and
- to provide a modular support frame for a vehicle door that is especially light yet strong and resistant to torsional bending.

SUMMARY OF THE INVENTION

The above objects have been achieved according to the invention, wherein at least a portion of the lower frame section, the forward frame section, and the rear frame section of a vehicle door are made of respective uniform sectional components, such as extruded section components. These sectional components each include a hollow or box section part that forms the major supporting structure and include extending webs that form intermediate spacing members of the modular supporting frame. The extending webs may be bent or angled at least along an edge portion, so as to form connecting flanges for mounting the various components and accessories of the vehicle door.

The use of continuous, uniform sectional parts with extending webs that may be cut and bent as needed, achieves an extremely simple and economical construction of a modular supporting frame for a vehicle door. The extending webs of each uniform sectional member are simply cut off and bent along an edge portion as needed, depending on the dimensions and assembly requirements of the modular supporting frame to be formed. Thereby, the laterally extending portion of each extending web forms the intermediate spacing member between the outer skin or outer panel of the door and the inner decorative cover panel of the door. Furthermore, it is a simple matter to provide appropriate holes in the webs forming the intermediate spacing members in order to attach various door components, such as lock mechanisms, to the modular supporting frame. The bent edge portions of the extending webs form connecting flanges to which the interior cover panel of the door will be attached, for example. Appropriate holes may be provided in the connecting flanges to allow attachment of the interior cover panel. Such a construction is quite strong and rigid because the connecting flanges are integrally formed with the modular supporting frame, and the flanges increase the stiffness and torsional rigidity of each frame member.

Thus, according to the invention, a modular supporting frame is made essentially from a single continuous sectional part which is automatically cut and bent as needed. Thus, the modular supporting frame according to the invention is simpler, stronger and more economical to manufacture than conventional door frames, which are made from numerous individual parts that are individually manufactured and machined and then painstakingly assembled, requiring numerous assembly steps.

Further, according to the invention, the extending webs of the continuous sectional members are not bent in their entirety relative to the hollow or box section part, but rather only a narrow edge portion of the extending webs is bent, for example, substantially perpendicularly to the laterally extending web portion or at any other required angle. Thus, the laterally extending web forms the intermediate spacing member and the narrow bent edge portion forms the connecting members or flanges described above.

According to a further advantageous feature of the invention, a window guide channel may be formed integrally in the uniform sectional components that form the frame sections.

The formation of a single structural unit comprising the supporting frame as well as the intermediate spacing members and connecting flanges as well as window guide channels allows an economical manufacture, because the assembly of the elements is facilitated, and the number of individual elements is reduced so that the resulting vehicle door frame is lightweight and strong.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
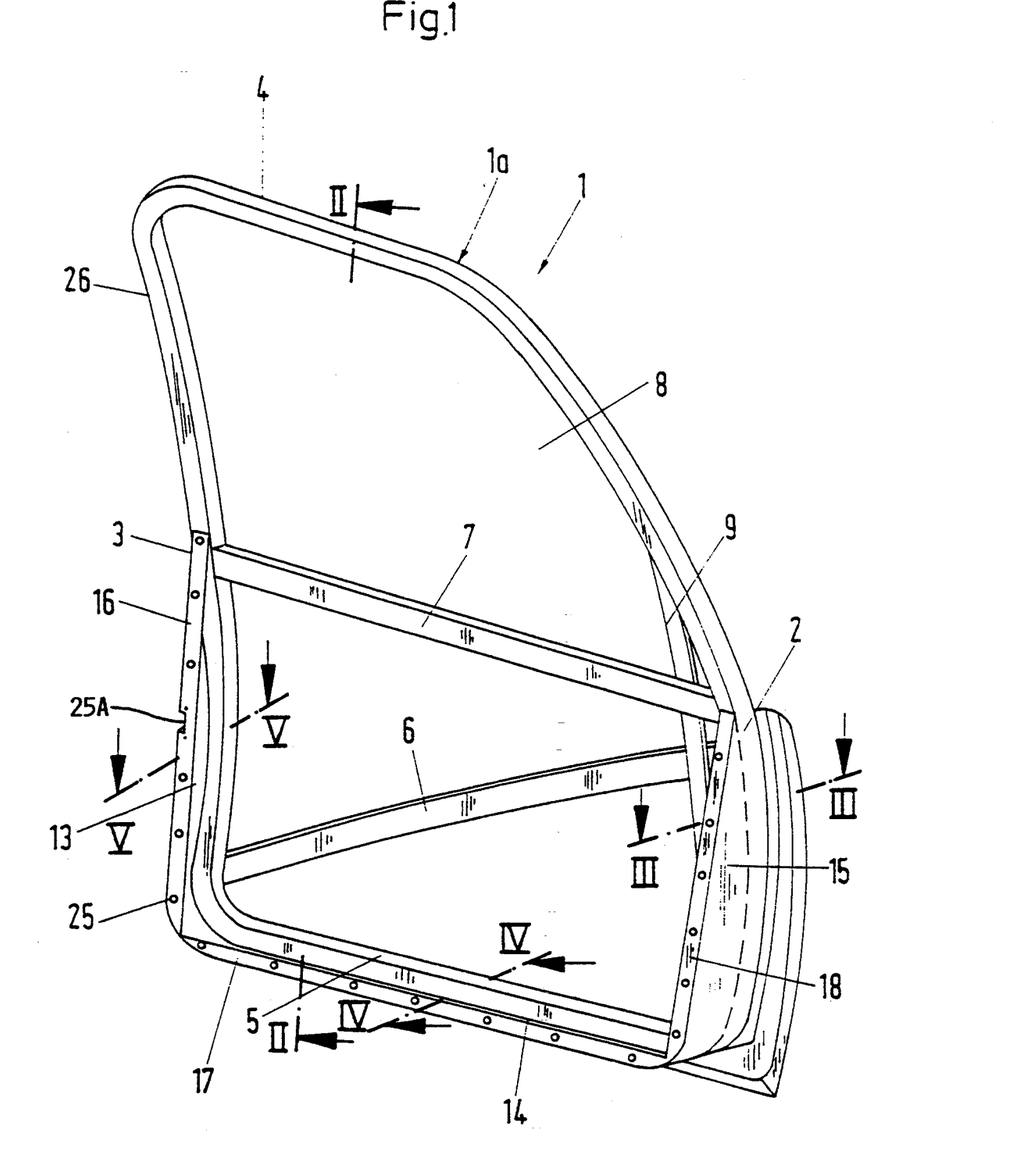
FIG. 1 is a perspective view of a modular supporting frame of a vehicle door according to the invention.

FIG. 1 shows a vehicle door frame, especially a passenger car door frame, according to the invention. As shown, a door frame 1 forming a supporting frame module 1A includes at least a forward frame section 2, a rear frame section 3, an upper frame section 4, as well as a lower frame section 5. A diagonal bracing strut 6 is connected at one end to the forward frame section 2 and at the other end to the rear frame section 3 in order to strengthen and stiffen the frame module 1A. A substantially horizontal crossbar 7 is connected at one end to the forward frame section 2 and at the other end to the rear frame section 3 to form a horizontal strengthening brace and to define the lower edge of a window opening 8. A straight window frame member 9 is arranged at the front of the door frame 1, extending substantially parallel to the rear frame section 3.

Figures 2, 2A:
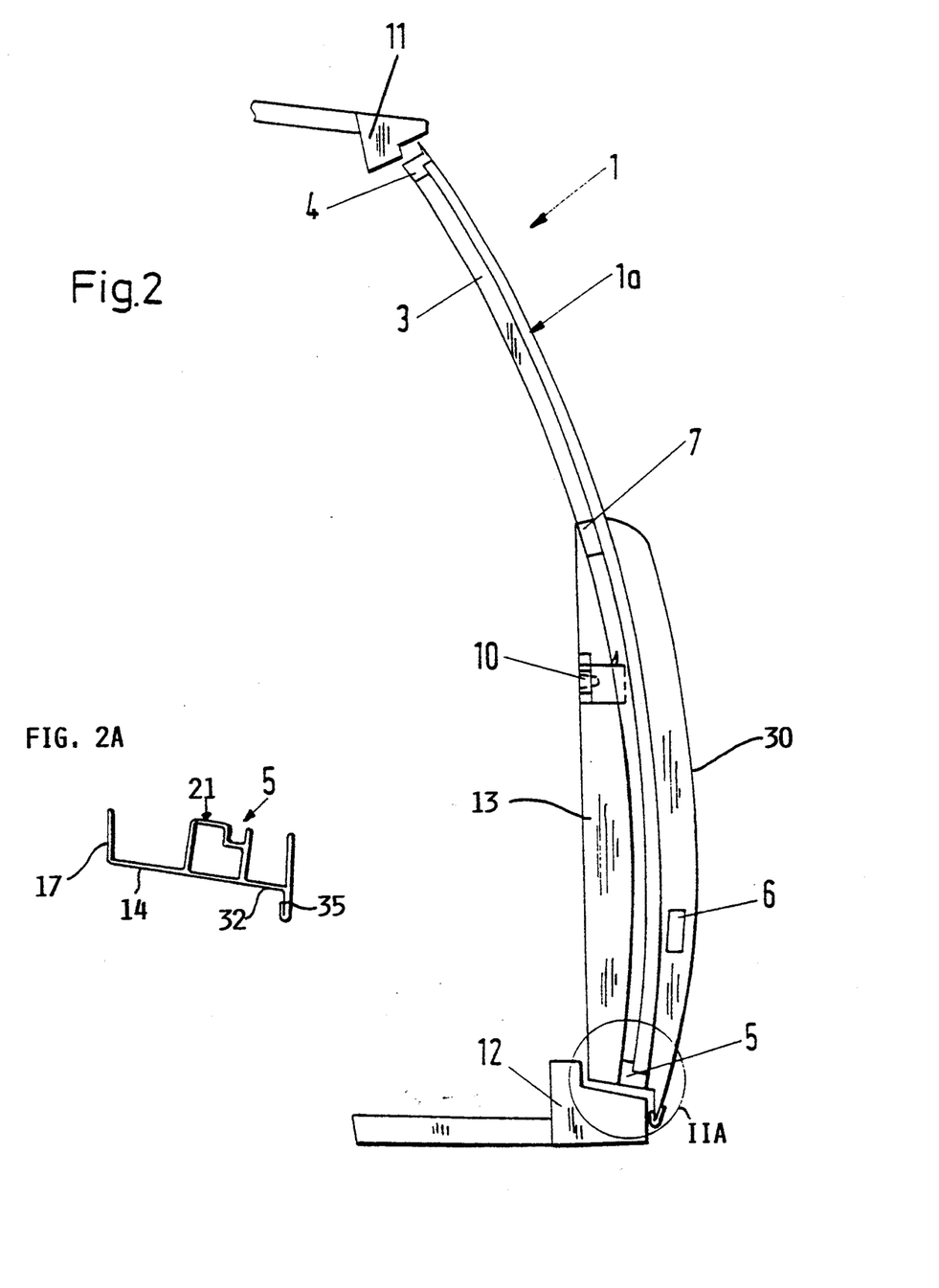
FIG. 2 is a sectional view along the line II—II in FIG. 1.
FIG. 2A is an enlarged detail view of the portion IIA of the view of FIG. 2.

The vehicle door according to the invention would be completed by attaching various mechanical elements and accessories which are generally not shown in the drawings. For example, a window pane would be installed to move up and down by means of a window lifting and lowering device while being guided by the window frame member 9. Furthermore, a lock mechanism, shown generally as 10 in FIG. 2, as well as hinges and the like would be attached to the door frame 1. FIG. 2 also schematically shows an upper vehicle body member 11 and a lower vehicle body member 12 which will carry and support the door frame 1 in a manner that is not the subject of this invention. The finished vehicle door will also include an inner decorative cover panel as well as an outer skin or panel. These are not shown in detail, but the outer skin 30 is shown schematically as an example in FIGS. 2 to 6.

The various components that complete the vehicle door, such as the lock mechanism, window lifting mechanism, inner cover panel, etc. must be securely attached to the door frame 1 in an appropriate manner, depending on the component's function. In order to achieve this, it is necessary to provide appropriate connection points on the frame and to provide sufficient space or volume within the finished door to enclose the functional components. For this purpose, the door frame 1 according to the invention comprises frame sections made of a continuous sectional member, such as an extruded section having the general cross-sectional form shown in the detailed view of FIG. 2A. FIG. 2A is a sectional view through the lower door frame section 5, which is generally representative of the frame sections according to the invention. In order to provide the necessary strength, each frame section includes a hollow or box cross-sectional part 21. In order to provide the necessary interior volume of the door, that is to say, the necessary spacing between the exterior panel and the interior panel, the frame members include laterally extending webs forming intermediate spacing members 13, 14, 15 and 31, 32, 33. In order to provide convenient attachment points for connecting the interior and exterior panels, as well as other elements and accessories for the door, the frame sections include interior connecting flanges 16, 17, 18 and exterior connecting flanges 34, 35, 36. The intermediate spacing members 13, 14, 15 and 31, 32, 33, as well as the connecting flanges 16, 17, 18 and 34, 35, 36 are each formed as an integral part of the respective frame sections 2, 3, 5 forming the door frame 1. Through such an integral construction, the manufacture of the door frame is quite economical, uncomplicated, and easy to carry out. The result is a finished door frame that is light, yet strong and resistant to torsional bending.

The overall construction of the door frame shown generally in FIGS. 1 and 2 is achieved according to the invention in that the lower frame section 5, the forward frame section 2, and the rear frame section 3 are constructed, over at least a portion of their length, from a continuous uniform sectional member 20, such as an extruded sectional member. The sectional member 20 includes the hollow or box cross-sectional portion 21 as well as laterally extending webs 22A and 22B which can be cut along their lateral edges and bent along an edge portion as needed to form the above mentioned intermediate spacing webs 13, 14, 15 and 31, 32, 33 as well as the connecting flanges 16, 17, 18 and 34, 35, 36.

Figure 3:
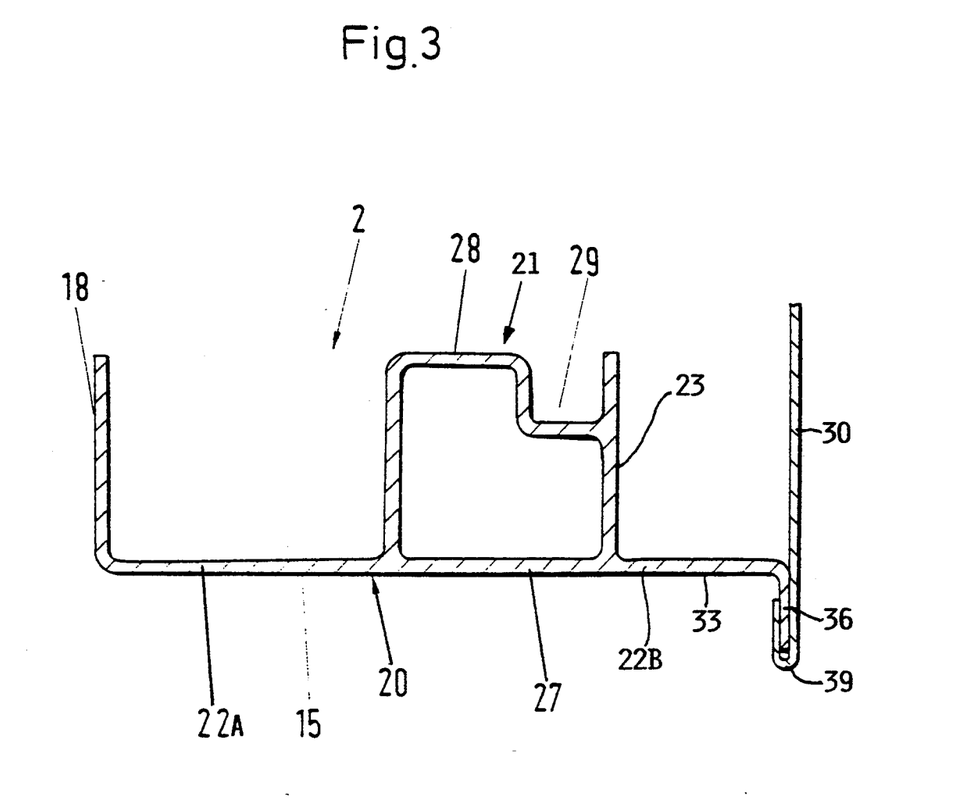
FIG. 3 is a sectional view along the line III—III in FIG. 1.

Referring particularly to FIG. 3, the forward frame section 2 comprises a sectional member 20 having a hollow or box cross-sectional part 21 including an inner surface wall 28 that defines the inner contour of the door frame 1 and an outer surface wall 27 that defines the outer contour of the door frame 1. A window guide channel 29 is formed in the box cross-sectional portion 21 of the sectional member 20. In equipping and outfitting the door frame 1 to complete a vehicle door, the window guide channel 29 will preferably directly receive a window seal and guide member, which is not shown. A window pane, which is also not shown, will then be guidingly supported either directly or via other holding members within the seal and guide element. Extending laterally from the outer surface wall 27 of the box cross-sectional member 21 are laterally extending webs 22A and 22B. The interior laterally extending web 22A is bent along its interior edge to form a connecting flange 18 extending substantially perpendicularly from the remaining portion of web 22A, which forms the intermediate spacing web 15. The exterior laterally extending web 22B is bent along its exterior edge to form a connecting flange 36 extending substantially perpendicularly from the remaining portion of the web 22B, which forms the intermediate spacing web 33. An exterior panel 30 of the vehicle door may be attached directly to the door frame by folding an edge portion 39 around the connecting flange 36, for example, or may be attached indirectly using additional attachment members, which are not shown. The exterior laterally extending web 22B may be omitted, whereby the outer panel 30 is to be connected directly to the exterior side 23 of the box cross-sectional component 21.

Figure 4:
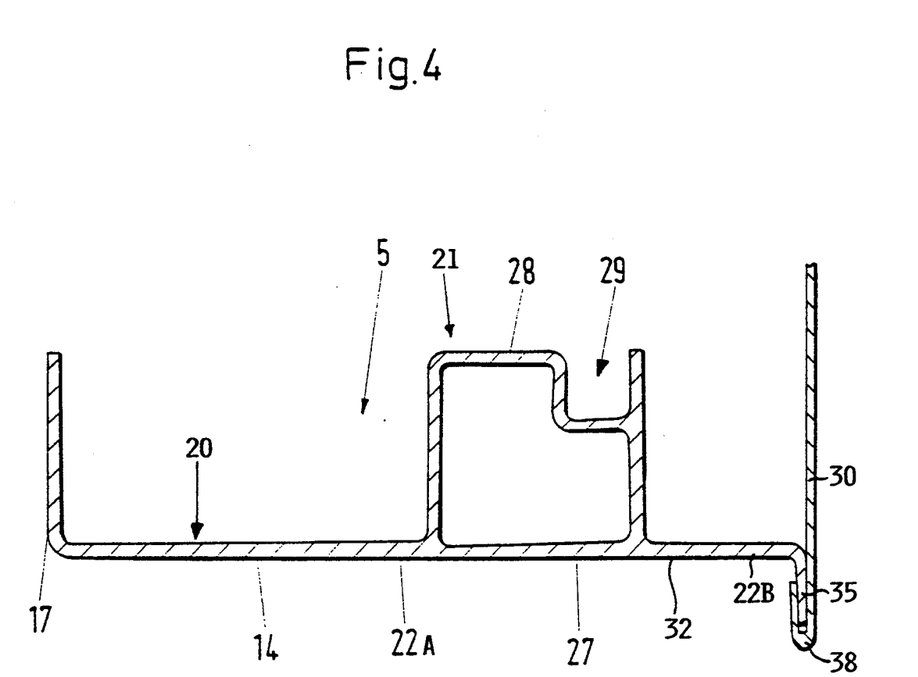
FIG. 4 is a sectional view along the line IV—IV in FIG. 1.

As shown in FIG. 4, the lower frame section 5 is also made of a continuous sectional member 20 similar to that of the forward frame section 2 described above. The lower frame section 5 includes a box cross-sectional portion 21 and laterally extending webs 22A and 22B. The web 22B is cut and bent as required to form an intermediate spacing web 32 and a connecting flange 35. The laterally extending web 22A forms the intermediate spacing web 14 and the connecting flange 17.

Figure 5:
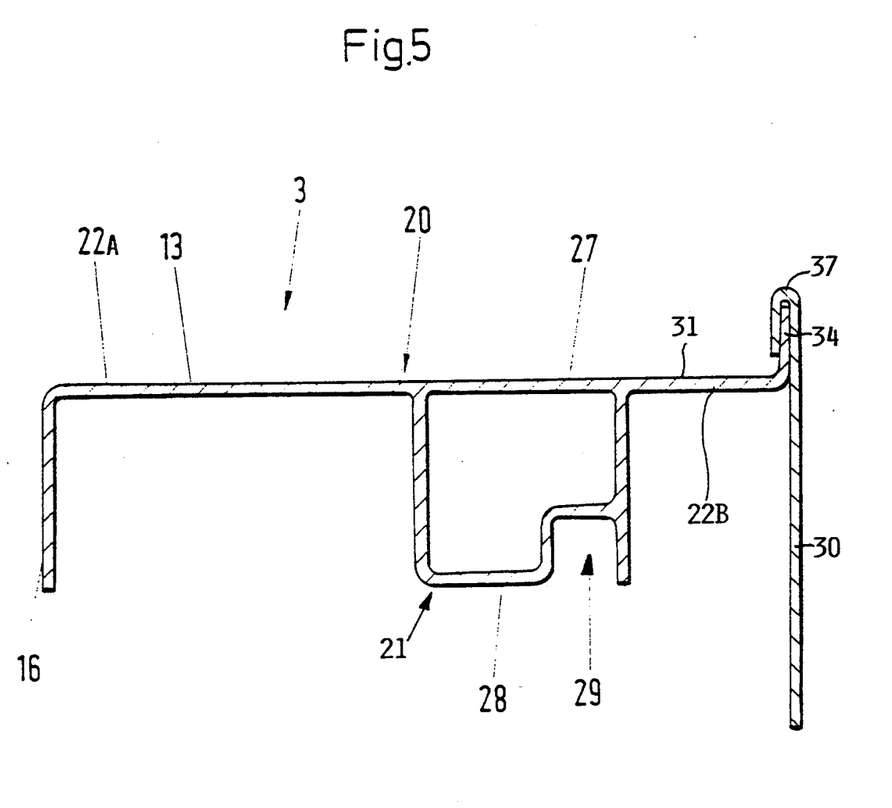
FIG. 5 is a sectional view along the line V—V in FIG. 1.

FIG. 5 shows the rear frame section 3 also made from a continuous sectional member 20 having a hollow box cross-sectional portion 21 with intermediate spacing webs 13 and 31 and connecting flanges 16 and 34.

A comparison of FIGS. 3, 4 and 5 shows that the forward, lower and rear frame sections have a generally similar shape and structure because they are formed from a continuous sectional member 20. However, there are certain variations. For example, the forward frame section 2 has a shorter, that is to say narrower, intermediate spacing web 15 at the cross-section shown in FIG. 3 than the corresponding intermediate spacing web 14 of the lower frame section 5 as shown in FIG. 4. The width of the intermediate spacing webs 13, 14, 15 and 31, 32, 33 may be selected as required by appropriately cutting and bending the laterally extending webs 22A and 22B as will be described below. The lateral width of the intermediate spacing web is dependent on the dimensions and form of the resulting vehicle door and can vary over the length of the frame section as shown, for example, in FIGS. 1 and 2. For example, FIG. 1 shows how the lateral width of the intermediate spacing web 15 of the forward frame section 2 varies from the bottom corner of the door where the forward frame section 2 meets the lower frame section 5 to the point where the horizontal cross-bar 7 joins the forward frame section 2. The connecting flanges 16, 17 and 18 are shown to have a uniform width over their entire length as can be seen in FIG. 1. When required, the connecting flanges 16, 17 and 18 may also be formed with a width that varies over their respective lengths.

Furthermore, the connecting flanges 16, 17, 18 and 34, 35, 36 may be provided with through holes 25 or cut-out notches 25A as required for attaching the interior cover panel or other door accessories, as shown in FIG. 1. The interior cover panel and other accessories may be attached directly to the connecting flanges, for example, by screws or clips or spot welding, but may also be attached indirectly via intermediate fastening members, which are not shown.

Figure 6:
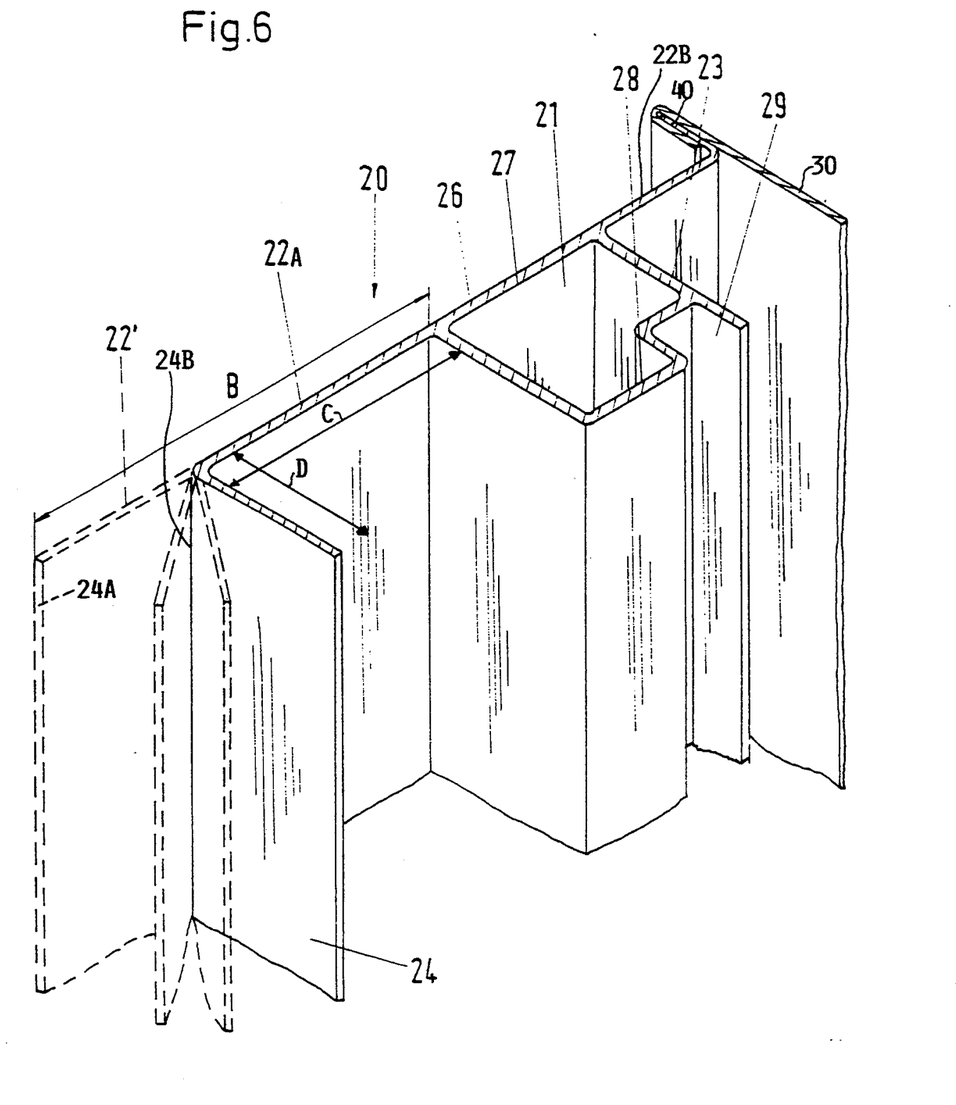
FIG. 6 is a perspective view of a continuous sectional member showing a laterally extending edge portion of a web in dashed lines and a bent-over edge portion in solid lines.

A method of forming the frame sections from a continuous sectional member 20 such as an extruded sectional member, according to the invention, will now be described with reference to FIG. 6. First, an automatic extrusion press extrudes a continuous sectional member 20 having a hollow or box cross-sectional portion 21 and laterally extending webs 22A and 22B. The continuous sectional member 20 may, for example, be an extruded metal alloy sectional member, a synthetic material extruded member, or a composite material member. Initially, the extruded web 22A is a flat web, shown by dashed lines 22', extending laterally from the wall 27 of the box cross-sectional portion 21 that forms the outer contour 26 of the door frame 1. The laterally extending web 22B is initially also a straight flat extending web, but is shown already bent in FIG. 6. The continuous sectional member 20 is then cut into respective lengths required to form the frame sections 2, 3 and 5. Once formed as described below, the frame sections 2, 3 and 5 will be joined together, for example by welding, to form the door frame 1. Alternatively, the single continuous sectional member 20 is not cut but is simply bent at respective corners to form the frame sections 2, 3 and 5 without requiring welding to join the adjacent frame sections to each other.

As the next operation, the laterally extending edges of the webs 22A and 22B are cut-off as shown, for example, by the dashed edge 24A. As extruded, the width of each flange 22A and 22B is continuous and uniform, but is simply cut to the required width B as shown. The required width B varies over the length of the respective frame section, depending on the specific dimensions and form of the vehicle door to be manufactured. The width B corresponds substantially to the required width C of the intermediate spacing web 13, 14 or 15 plus the required width D of the connecting flange 16, 17 or 18. As described above, the required width C varies, while the required width D is maintained constant over the entire length of the respective frame section in the preferred embodiment.

As a next operation, an edge portion 24 of the laterally extending web 22A is bent along an edge line 24B to form the respective connecting flange 16, 17 or 18. The position of the edge line 24B is selected as required to provide the required width C of the intermediate spacing web 13, 14 or 15. The angle at which the edge portion 24 is bent is selected, depending on the form and structure of the door to be manufactured. Preferably, the edge portion 24 is bent substantially perpendicularly to the laterally extending web 22A so that the finished connecting flange 16, 17 or 18 formed by the edge portion 24 extends substantially parallel to an exterior wall 23 of the box cross-sectional portion 21. Finally, the connecting flanges, as well as the intermediate spacing webs and the box cross-sectional member, may be provided with through holes 25 or cut-out notches 25A, as shown in FIG. 1, for attaching various finish components and accessories to the door frame.

The exterior intermediate spacing web and connecting flange are formed from the laterally extending web 22B in a manner similar to that described in relation to the web 22A, in that an edge portion 40 is bent. Alternatively, the exterior connecting flange 34, 35, 36 may be omitted and the external intermediate spacing web 31, 32, 33 may even be omitted, whereby the exterior skin or panel 30 is mounted directly on the exterior wall 23 of the box cross-sectional member 21.

Although the invention has been described with reference to specific example embodiments, it will be appreciated that it is intended to cover all modifications and equivalents within the scope of the appended claims.

What we claim is:

1. A vehicle door frame comprising an upper frame section (4), a lower frame section (5), a forward frame section (2) and a rear frame section (3), wherein each of said lower frame section (5), said forward frame section (2), and said rear frame section (3) comprises a sectional component (20) including a hollow box sectional portion (21), a first intermediate spacing web (13, 14, 15) extending laterally from and longitudinally along said box sectional portion (21) and a first connecting flange (16, 17, 18) extending at an angle relative to and longitudinally along said first intermediate spacing web (13, 14, 15).

2. The vehicle door frame of claim 1, wherein said sectional component (20) is an extruded sectional component.

3. The vehicle door frame of claim 1, wherein said box sectional portion (21), said first intermediate spacing web (13, 14, 15) and said first connecting flange (16, 17, 18) are formed integrally as said sectional component (20).

4. The vehicle door frame of claim 3, wherein said first connecting flange (16, 17, 18) and said first intermediate spacing web (13, 14, 15) are formed as a single flat web (22A) of which an edge portion (24) is bent to form said first connecting flange (16, 17, 18).

5. The vehicle door frame of claim 4, wherein said single flat web (22A) is cut along an edge (24A) to provide said first intermediate spacing web (13, 14, 15) with a desired width (C).

6. The vehicle door frame of claim 1, wherein the lateral width of said first intermediate spacing web (13, 14, 15) varies along its longitudinal length.

7. The vehicle door frame of claim 1, wherein said hollow box sectional portion (21) includes an outer box wall (27) that defines an outer contour of said door frame, and wherein said first intermediate spacing web (13, 14, 15) extends from said hollow box sectional portion (21) as a flush extension from said outer box wall (27).

8. The vehicle door frame of claim 1, wherein said hollow box sectional portion (21) includes an inner box wall (28) that defines an inner contour of said door frame, and wherein said inner box wall (28) includes a channel portion forming a window guide channel (29).

9. The vehicle door frame of claim 1, wherein said first connecting flange (16, 17, 18) extends substantially perpendicularly to said first intermediate spacing web (13, 14, 15).

10. The vehicle door frame of claim 1, wherein said sectional component (20) further comprises a second intermediate spacing web (31, 32, 33) extending laterally from and longitudinally along said box sectional portion (21) and a second connecting flange (34, 35, 36) extending at an angle relative to and longitudinally along said second intermediate spacing web (31, 32, 33).

11. The vehicle door frame of claim 10, wherein said second intermediate spacing web (31, 32, 33) extends from said box sectional portion (21) in the same plane and in an opposite direction as said first intermediate spacing web (13, 14, 15).

12. The vehicle door frame of claim 10, wherein said second connecting flange (34, 35, 36) extends substantially perpendicularly to said second intermediate spacing web (31, 32, 33).

13. A method of manufacturing a supporting frame for a vehicle door, comprising the following steps:
   (a) forming a uniform continuous sectional member (20) having a box cross-sectional portion (21) and a laterally extending web (22A);
   (b) bending an edge portion (24) of said laterally extending web (22A) to form a connecting flange (16, 17, 18) from said edge portion (24) and an intermediate spacing web (13, 14, 15) from a remaining portion of said laterally extending web (22A) between said connecting flange (16, 17, 18) and said box cross-sectional portion (21); and
   (c) forming said supporting frame from said bent continuous sectional member.

14. The method of claim 13, further comprising cutting said continuous sectional member (20) into a plurality of respective frame sections (2, 3, 5), wherein said step (c) of forming said supporting frame comprises joining said respective frame sections.

15. The method of claim 13, wherein said step (a) comprises forming said uniform continuous sectional member to further have a second laterally extending web (22B).

16. The method of claim 15, wherein said step (b) further comprises bending an edge portion (40) of said second laterally extending web (22B).

17. The method of claim 13, wherein said step (a) comprises extruding said uniform continuous sectional member.

18. The method of claim 13, further comprising a step of cutting said laterally extending web (22A) to a required width.

19. The method of claim 18, wherein said step of cutting said laterally extending web (22A) to a required width and said step (b) of bending an edge portion (24) are carried out so as to achieve a lateral width of said intermediate spacing web (13, 14, 15) that varies over a longitudinal length of said intermediate spacing web.

* * * * *